United States Patent [19]

Song

[11] Patent Number: 5,936,954
[45] Date of Patent: Aug. 10, 1999

[54] METHOD FOR ASSIGNMENT OF INPUT PORT NUMBERS IN 3-DIMENSION BANYAN SWITCHING NETWORK OF ASYNCHRONOUS TRANSFER MODE

[75] Inventor: Doug-Young Song, Seongnam, Rep. of Korea

[73] Assignee: SamSung Electronics Co., Ltd., Kyungki-do, Rep. of Korea

[21] Appl. No.: 08/774,179

[22] Filed: Dec. 26, 1996

[30] Foreign Application Priority Data

Dec. 26, 1995 [KR] Rep. of Korea ....................... 95-56579

[51] Int. Cl.⁶ .................................................. H04L 12/50
[52] U.S. Cl. ............................................ 370/380; 370/398
[58] Field of Search ...................................... 370/380, 411, 370/357, 360, 386–388, 398; 340/825.79, 825.8, 825.85, 825.89

[56] References Cited

U.S. PATENT DOCUMENTS

| | | | |
|---|---|---|---|
| 4,910,730 | 3/1990 | Day, Jr. et al. ......................... | 370/411 |
| 5,130,976 | 7/1992 | Hickey et al. ........................... | 370/396 |
| 5,278,548 | 1/1994 | Haber ...................................... | 370/380 |
| 5,357,510 | 10/1994 | Norizuki et al. ........................ | 370/395 |
| 5,465,251 | 11/1995 | Judd et al. ............................... | 370/351 |
| 5,491,687 | 2/1996 | Christensen et al. .................... | 370/253 |
| 5,509,123 | 4/1996 | Dobbins et al. .................... | 395/200.73 |
| 5,546,540 | 8/1996 | White .................................. | 395/200.53 |

*Primary Examiner*—Jason Chan
*Assistant Examiner*—Jasper Kwoh
*Attorney, Agent, or Firm*—Robert E. Bushnell, Esq.

[57] ABSTRACT

Input port numbers are assigned so as to allow formation of a unit switch having a given scale of module characteristic for a 3-dimensional installation of a switching network in an asynchronous transfer mode on basis of the Banyan network. A multiplicity of unit switches of a small (n×n) scale, positioned in a front portion of the switching network, are partitioned in front unit switches. A multiplicity of unit switches of the same small (n×n) scale, positioned in a rear portion of the switching network, are partitioned in rear unit switches. Output ports of the front unit switches are coupled in sequence in a crossed manner to input ports of the rear unit switches. Further, the input port numbers of said front unit switches are reassigned in accordance with a given formula, and the output port numbers of said rear unit switches are assigned in sequence from the uppermost position to the lowermost position.

19 Claims, 7 Drawing Sheets

PCB Patterns

METHOD FOR ASSIGNMENT OF INPUT PORT NUMBERS IN 3-DIMENSION BANYAN SWITCHING NETWORK OF ASYNCHRONOUS TRANSFER MODE

CLAIM OF PRIORITY

This application makes reference to, incorporates the same herein, and claims all benefits accruing under 35 U.S.C § 119 from an application entitled Method for Assignment of Input Port Numbers in 3-dimension Banyan Switching Network of Asynchronous Transfer Mode earlier filed in the Korean Industrial Property Office on Dec. 26, 1995, and there duly assigned Serial No. 56579/1995 by that Office.

BACKGROUND OF THE INVENTION

1. Field of the Invention

The present invention relates to a method for formation of a switching network in an asynchronous transfer mode (ATM) on basis of a "Banyan" network. More particularly, the present invention relates to a method for assignment of input port numbers, so as to be capable of 3-dimensional installation of the switching network.

2. Description of the Related Art

Recently, switching networks based on the Banyan network come into wide use for the asynchronous transfer mode (ATM) switching networks. An ATM switching network generally requires transmission capability of at least hundreds of megabits per second (Mb/s) of transmission speed per port and a larger scale switching network for such high transmission speed. However, as noted in the art, various limitations in some hardware factors exist in areas such as reception of circuit components in a printed circuit board and its size. A fiber of connector pins and a number of connections in a printed circuit board (PCB), transmission speed per link, etc. would be quite difficult in developing to a larger scale of Banyan switching network.

On this matter, among the exemplars of a contemporary practice are White (U.S. Pat. No. 5,546,540, *Automatic Topology Monitor For Multi-Segment Local Area Network,* Aug. 13, 1996) discussing an automatic topology monitor for multi-segment local area network, which includes segment monitor nodes which report the presence of new end nodes to a network manager node. Dobbins et al. U.S. Pat. No. 5,509,123, *Distributed Autonomous Object Architectures For Network Layer Routing,* Apr. 16, 1996) discusses an object-oriented architecture for network layer routing which distributes function and system behavior into automomous router objects. Christensen et al. (U.S. Pat. No. 5,491,687, *Method And System In A Local Area Network Switch For Dynamically Changing Operating Modes,* Feb. 13, 1996) discusses a local area network (LAN) switch having means for switching modes of operation in response to a rate at which frames having an error pass through such a LAN switch. Judd et al. (U.S. Pat. No. 5,465,251, *Network Addressing,* Nov. 7, 1995) discusses a network addressing scheme in which a message sent from a source node to a destination node includes a path address which defines the path over which the message should travel to reach the destination node. Norizuki et al. (U.S. Pat. No. 5,357,510, *Apparatus And A Method For Supervising And Controlling ATM Traffic,* Oct. 18, 1994) discusses an apparatus for supervising and controlling asynchronous transfer mode (ATM) traffic, and which collects traffic information. The apparatus comprises a cell detecting unit, an idle cell detecting unit, a cell counting unit, an idle cell counting unit, an idle cell rate detecting unit, and a control unit. From my study of these exemplars and of the prior art, I believe that there is a need for a more effective and improved method for formation of a switching network in an asynchronous transfer mode (ATM) on basis of a "Banyan" network, as in the present invention.

SUMMARY OF THE INVENTION

Accordingly, an object of the present invention is to provide an improved method for formation of a switching network in an asynchronous transfer mode (ATM) on basis of a "Banyan" network.

Another object of the present invention is to provide an improved method for assignment of input port numbers, so as to be capable of 3-dimensional installation of the switching network.

Another object of the present invention is to provide a method for assignment of input port numbers so as to allow formation of a unit switch having a predetermined scale of module characteristic for a 3-dimensional installation of a switching network in an asynchronous transfer mode (ATM) on basis of the "Banyan" network.

The above and other objects can be achieved according to the present invention which provides a method for formation of a 3-dimensional asynchronous transfer mode switching network of a large (N×N) scale. A multiplicity of unit switches of a small (n×n) scale, positioned in a front portion of the switching network, are partitioned as front unit switches. A multiplicity of unit switches of the same small (n×n) scale, positioned in a rear portion of the switching network, are partitioned as rear unit switches. Output ports of the front unit switches are coupled in sequence in a crossed manner to input ports of the rear unit switches. The input port numbers of the front unit switches are re-assigned in accordance with a given formula. The output port numbers of said rear unit switches are assigned in sequence from the uppermost position to the lowermost position.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a schematic diagram illustrating the construction of an output port number table with 1,024×1,024 scale of Banyan network constructed with the 3-dimensional switch installation, in which table the output port numbers are re-allocated, and the table and the network being constructed according to the principles of the present invention;

FIG. 7 is a schematic diagram illustrating the construction of an input port number table with 1,024×1,024 scale of Banyan network constituted according to the 3-dimensional switch installation, in which the input port numbers of the table are allocated according to the principles of the present invention.

DETAILED DESCRIPTION OF TIM PREFERRED EMBODIMENT

Figure 1:
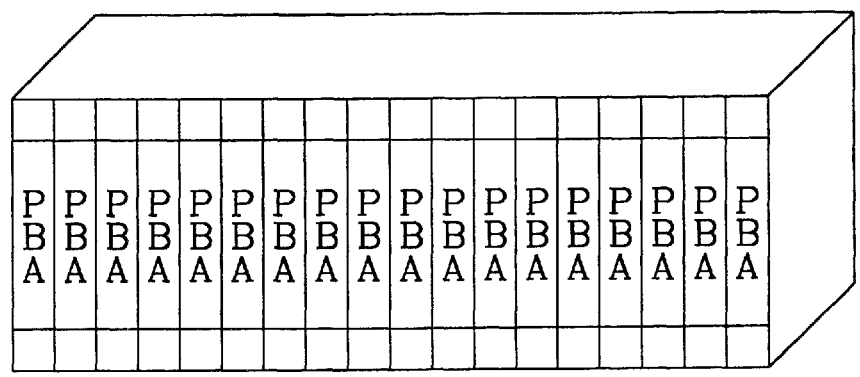
FIG. 1 is a front view of a so-called book shelf type of switching network apparatus.
Figure 2:
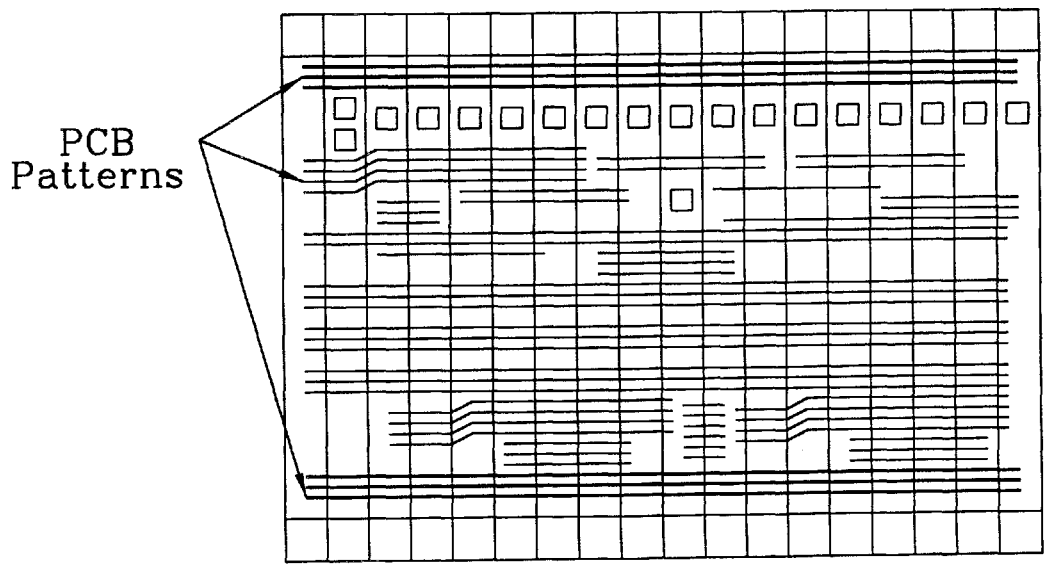
FIG. 2 is a rear view of the switching network apparatus of FIG. 1, illustrating a shape of electrical connection of signal lines.

According to a contemporary practice, a large scale of ATM switching network based on the Banyan network is provided with a multiplicity of printed circuit board which are installed in a book shelf form, as illustrated in FIGS. 1 and 2. FIG. 1 shows a front view of a PCB self of the switching network and FIG. 2 shows a rear view of the PCB shelf with its electrical connections exposed—and further through, one or more PCB patterns in its backboard, a unit printed circuit board constituting die overall switching network, are connected to each other.

The following disadvantages are noted in installing the plurality of PCBs in the book shelf form constituting a switching network in a large scale of ATM switching network which requires a very high speed of signal transmission.

First, as the number of links to be connected between the PCBs in the large scale of ATM switching network are greatly increased, it will be difficult for a known existing hardware environment to be adapted to use for installation of PCBs because the number of connector pins used in the PCBs is normally limited, thereby restricting the number of links capable of connection between the PCBs. Although this drawback may be avoided by enlarging die size of PCBs in backboards of the switching network and using more connectors therein, such would often cause the PCBs to bend over their frames due to the excessive weight which may exercise an adverse effect on the structural stability of PCBs.

Figure 3:
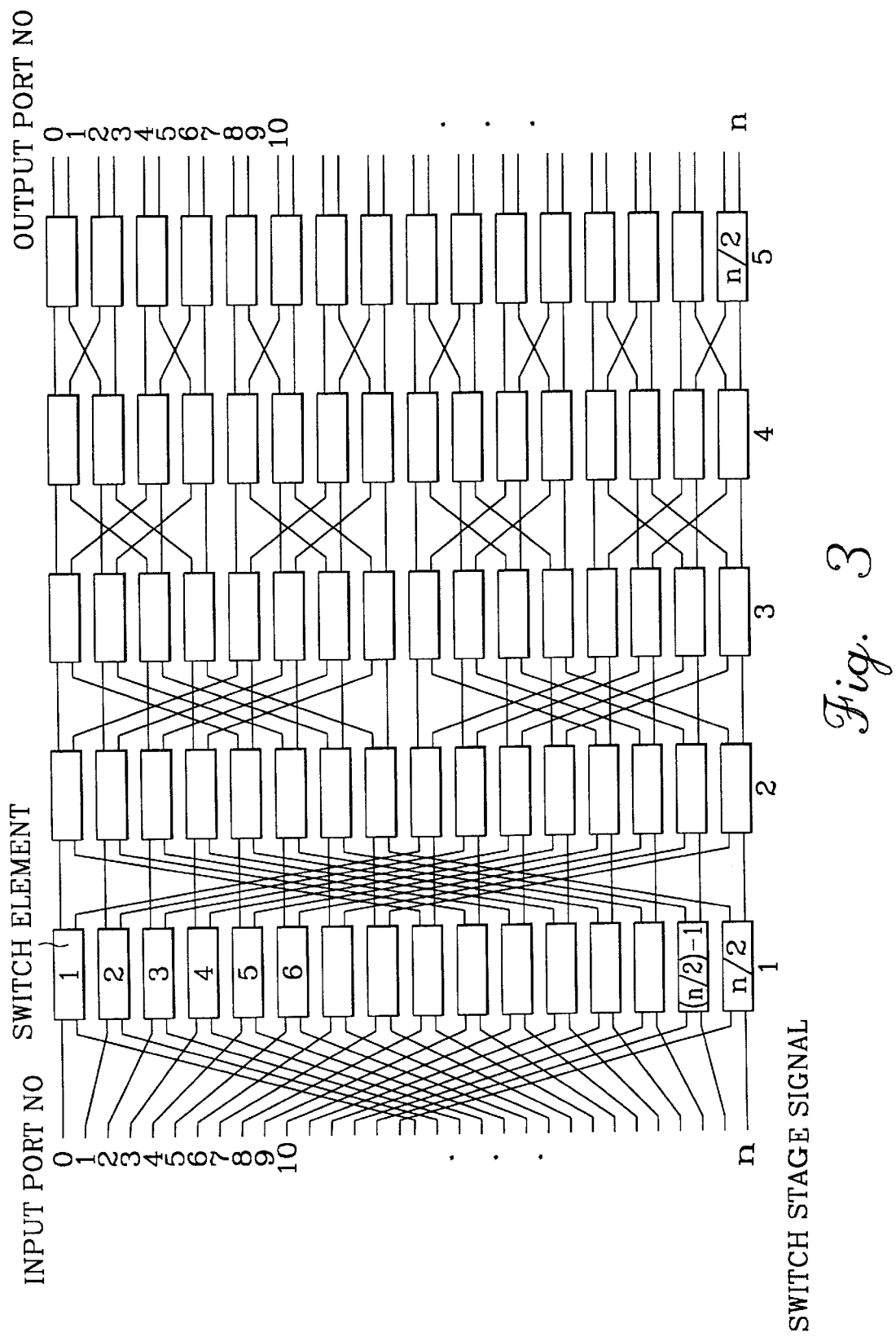
FIG. 3 is a schematic diagram illustrating the construction of a unit switch with an a×a scale of Banyan network constituted according to the principles of The present invention.

Next, in the book shelf form of switching network apparatus, as the PCBs are installed one after another, one by one, in order of their sequential numbers, the farther a PCB is positioned from the first one, the longer a length of the linkage for connection with the PCB becomes. Hence, as the transmission speed per port in the ATM switching network reaches hundreds of Mb/s, such a difference between linkage lengths for connection with other PCBs causes an adverse generation of a delay variation or a jitter in signal transmission. The delay variation has the important influence on the high speed transmission of the ATM and other synchronous switching networks. Furthermore, as such a book shelf form of switching network apparatus also tends to have a limitation on the effective transmission distance in the high speed transmission of the ATM switching network, a connection in between those PCBs spaced farther apart from each other, as shown in FIG. 3, would result in considerable attenuation of a transmitted signal to thereby lead to a failure of normal transmission. For instance, when the transmission speed per bit in application of 160 Mb/s signal transmission is 6.25E-9, a transmission distance capable of transmission without such a significant attenuation of signal through the PCB patterns in the ATM switching network is a few of centimeters (at the maximum). Therefore, the lengths of connections greatly affect the occurrence of signal attenuation—the better transmission reliability of the ATM switching network.

Figure 4:
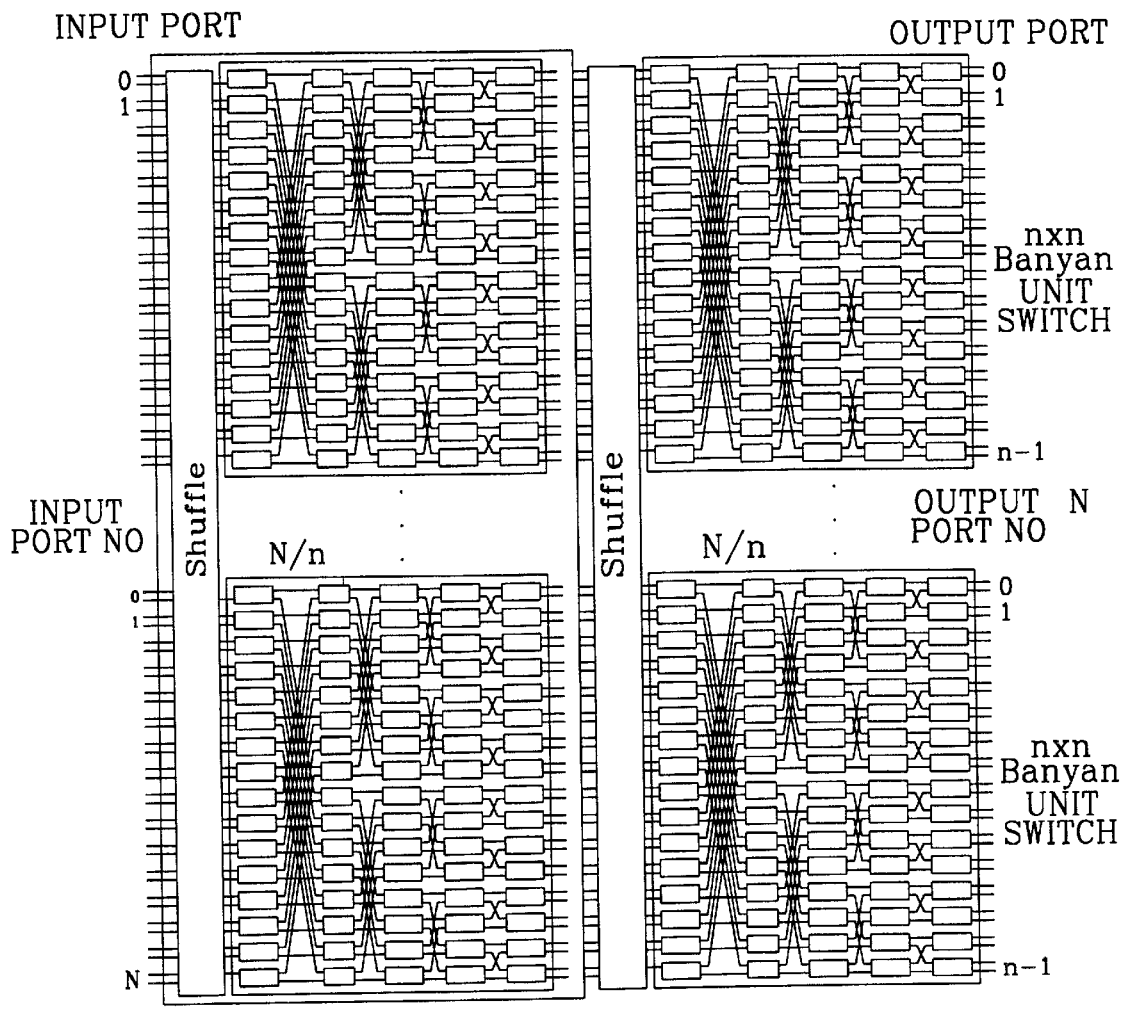
FIG. 4 is a schematic diagram illustrating the construction of an ATM switching network with an N×N scale of Banyan network constructed according to the principles of the present invention.

The present invention may use a unit switch with n×n scale constituted by means of a 3-dimensional arrangement. This can solve one or more of the aforementioned problems caused in application of a large scale of Banyan network with N×N size, wherein a number 'n' denotes a number of input/output ports for a unit switch and a number "N" denotes a number of input/output ports for a switching network. FIG. 3 is a schematic diagram illustrating the construction of a unit switch, with n×n scale, of the switching network according to the present invention. FIG. 4 is a schematic diagram illustrating the construction of the ATM switching network with N×N scale of Banyan network constituted according to the principles of the present invention.

Figure 5:
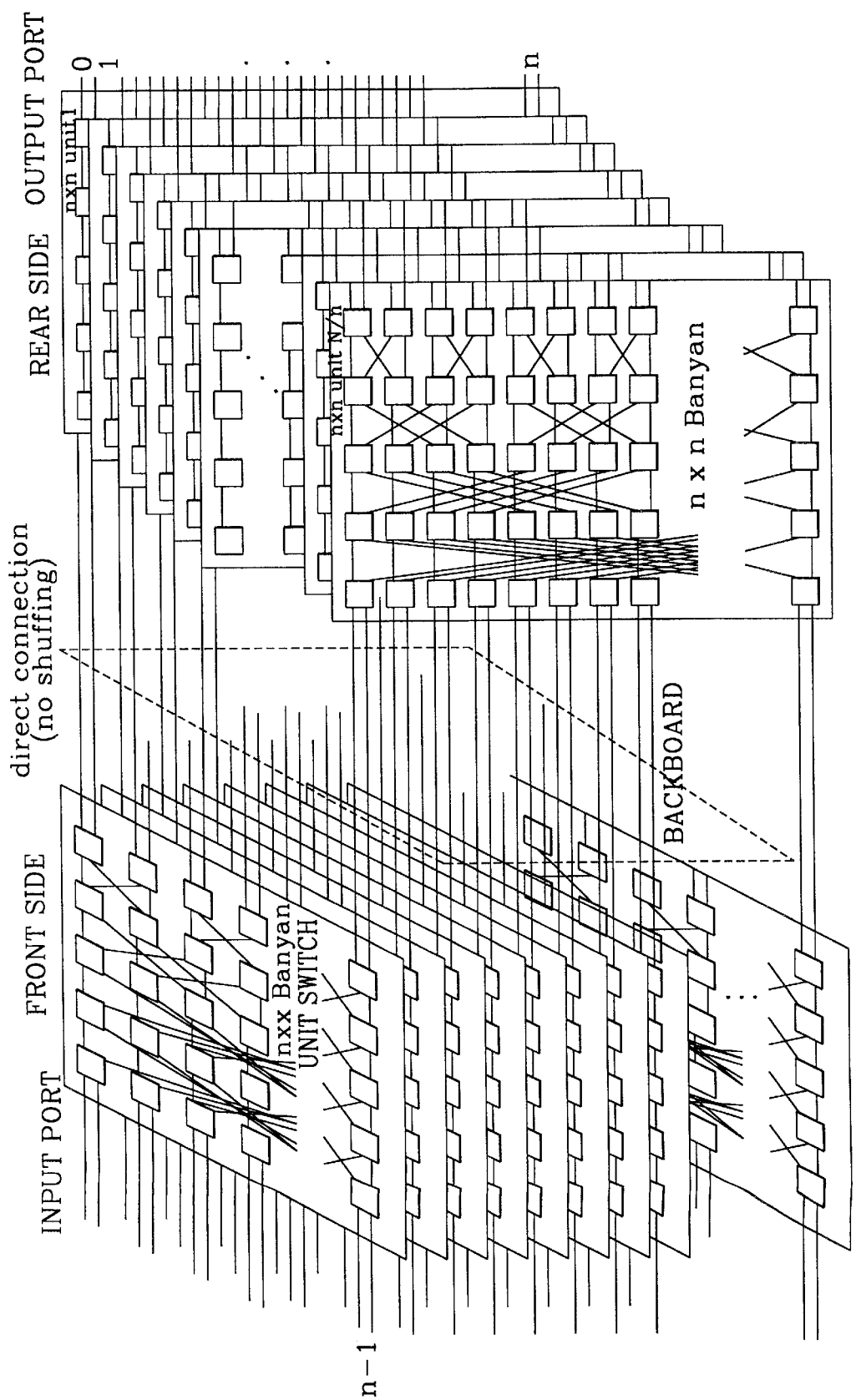
FIG. 5 is a schematic diagram illustrating the construction of a 3-dimensional switch with an N×N scale of Banyan network constructed according to the principles of the present invention.

In FIG. 5, there is shown a detailed construction of the 3-dimensional arrangement of switching network based upon the N×N scale of Banyan network constituted as shown in FIG. 4. This 3-dimensional arrangement of switching network is developed by dividing a large N×N scale of switching network into a plurality of small modules of n×n size, positioning these modules in both a front side and a rear side: of its backboard in a perpendicular direction with respect to each other, and directly connecting through connectors on the backboard to each other where applicable.

However, in a situation where the n×n scale of unit switches are adapted to be coupled to each other in under to form a 3-dimensional switching network on basis of the Banyan network, a shuffle relation within the switching network should be considered. That is, in a situation where the n×n scale of unit switches in the 3-dimensional arrangement are used to from the N×N Banyan network, the resultant switching network would be unable to provide the original characteristic of the Banyan network itself because the positions of connection linkages between the unit switches positioned in a front side of the backboard and the corresponding unit switches positioned in a rear side of the backboard are changed in a certain amount. Accordingly, In order to keep the characteristic of the Banyan network as it was, a reshuffling in the switching network has to be made in its input or output link.

Accordingly, the invention provides a method for reshuffling the input link so as to keep the characteristic of the Banyan network without change, even in a situation where the n×n scale of unit switches in the 3-dimensional arrangement are used to form the N×N Banyan switching network. Also, the reshuffling of input link should be performed for the input links of all the unit switches, with this particular rule taken, because the unit switches in both the front side and the rear side of the back-board are coupled together in this particular form in the 3-dimensional arrangement.

The invention provides a method for reshuffling the input ports to be adjusted when making the large scale of switching network based upon the Banyan network into the n×n scale of unit switch modules and constructing the 3-dimensional arrangement of entire switching network by using the unit switch modules. To modularize the entire switching network into a multiplicity of n×n scale of unit switches requires partitioning of switches due to the limitation of a number of circuit components receivable within a PCB or semiconductor device according to the various hardware conditions. Here, the unit switches should have the modularity because the entire switching network can be constructed by utilizing a plurality of identical unit switches with such modularity. Thus, the switching network could be manufactured with one kind of unit switch. However, in a situation that the unit switches are split into smaller modules without the modularity taken into account, several kinds of small switches will have to be utilized in construction of the entire switching network.

After manufacturing the aforementioned n×n size of unit switches, the 3-dimensional arrangement system is used to construct the entire switching network with these unit switches, in which system overcomes the drawbacks resulted from the prior book shelf type arrangement of printed circuit board. Thus, as the link connection between the unit switches is made not through a connection via its electrical signal line as done in the book shelf type, but directly through the connector in the backboard, there is no need to connect the N number of signal links to the electrical signal in the backboard. Hence, in case of N×N switching network, the numbers of the input links, output links and connection links between the unit switches are all "N", respectively. Therefore, the delay variation in signal transmission will not occur in the links used for connection between the unit switches; it may result in prevention of the signal attenuation.

However, in case where the n×n scale of unit switches are adapted to be coupled to each other in order to form a 3-dimensional switching network on basis of the Banyan network, the resultant switching network would be unable to provide the original characteristic or the Banyan network itself because the positions of connection linkages between the unit switches positioned in a front side of the backboard and the corresponding unit switches positioned in a rear side of the backboard are changed in a certain amount. Accordingly, n order to keep the characteristic of the Banyan network as it was, a reshuffling in the switching network has to be made in its input or output link.

The invention therefore provides a method for reshuffling the input link so as to keep the characteristic of the Banyan network without change in case where the n×n scale of unit switches in the 3-dimensional cross arrangement are used to form the N×N Banyan switching networks. Referring to the following table, there is shown a method for calculating the input port numbers in accordance with the unit switch. In the table, values in each row correspond to the input port numbers of the unit switches, wherein the first row denotes an input port number for the uppermost unit switch installed onto a front side of the backboard, and then likewise, an "n"th row denotes an input port number for the "n"th unit switch installed onto a front side of the backboard. In the input port numbers for unit switches, the uppermost port starts from "0" of the corresponding row, that is, where j=0, in the below table.

According to the table, the position (I, J) of each element can be represented in an n×n matrix defined by variables 'i' and "j", as follows:

Position (i, j), where $i$ (0,1,2,3 ... $n-1$)

$j$ (0,1,2,3 ... $n-1$)

wherein "n" denotes a size of the n×n square matrix, "i" a row number and "j" a column number.

TABLE

| i/j | n-1 | n-2 | n-3 | ... 2 | 1 | 0 |
|-----|-----|-----|-----|-------|---|---|
| 0 | 0,n-1 | 0,n-2 | 0,n-3 | ... 0,2 | 0,1 | 0,0 |
| 1 | 1,n-1 | 1,n-2 | 1,n-3 | ... 1,2 | 1,1 | 1,0 |
| 2 | 2,n-1 | 2,n-2 | 2,n-3 | ... 2,2 | 2,1 | 2,0 |
| 3 | 3,n-1 | 3,n-2 | 3,n-3 | ... 3,2 | 3,1 | 3,0 |
| " | " | " | " | | | |
| " | " | " | " | | | |
| n-2 | n-2,n-1 | n-2,n-2 | n-2,n-3 | ... n-2,2 | n-2,1 | n-2,0 |
| n-1 | n-1,n-1 | n-1,n-2 | n-1,n-3 | ... n 1,2 | n-1,1 | n-1,0 |

In the above table, a value of the element (i,j) is obtained by the following formula: (i,j)=Xn+Y, wherein Xn={[j] quo2+n/2[j]mod2) and Y=([i]quo2+n/2[i]mod2) and wherein "[i]quo2" denotes the quotient of "i" divided by 2 and "[i]mod2" denotes the remainder of "i" divided by 2, while "[j]quo" denotes the quotient of "j" divided by 2 and "[j]mod2" denotes the remainder of "j" divided by 2.

Figure 6:
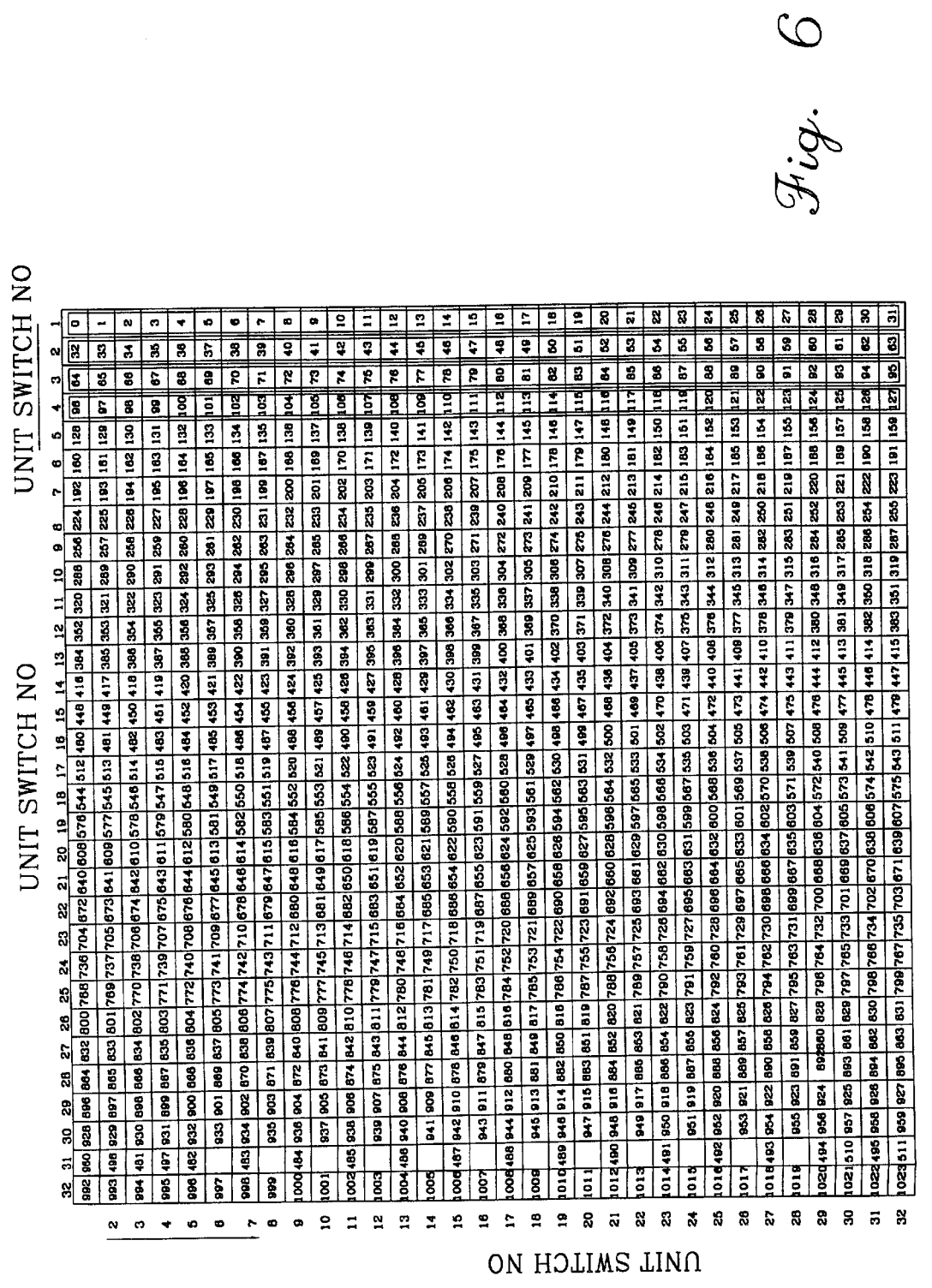
Figure 8:
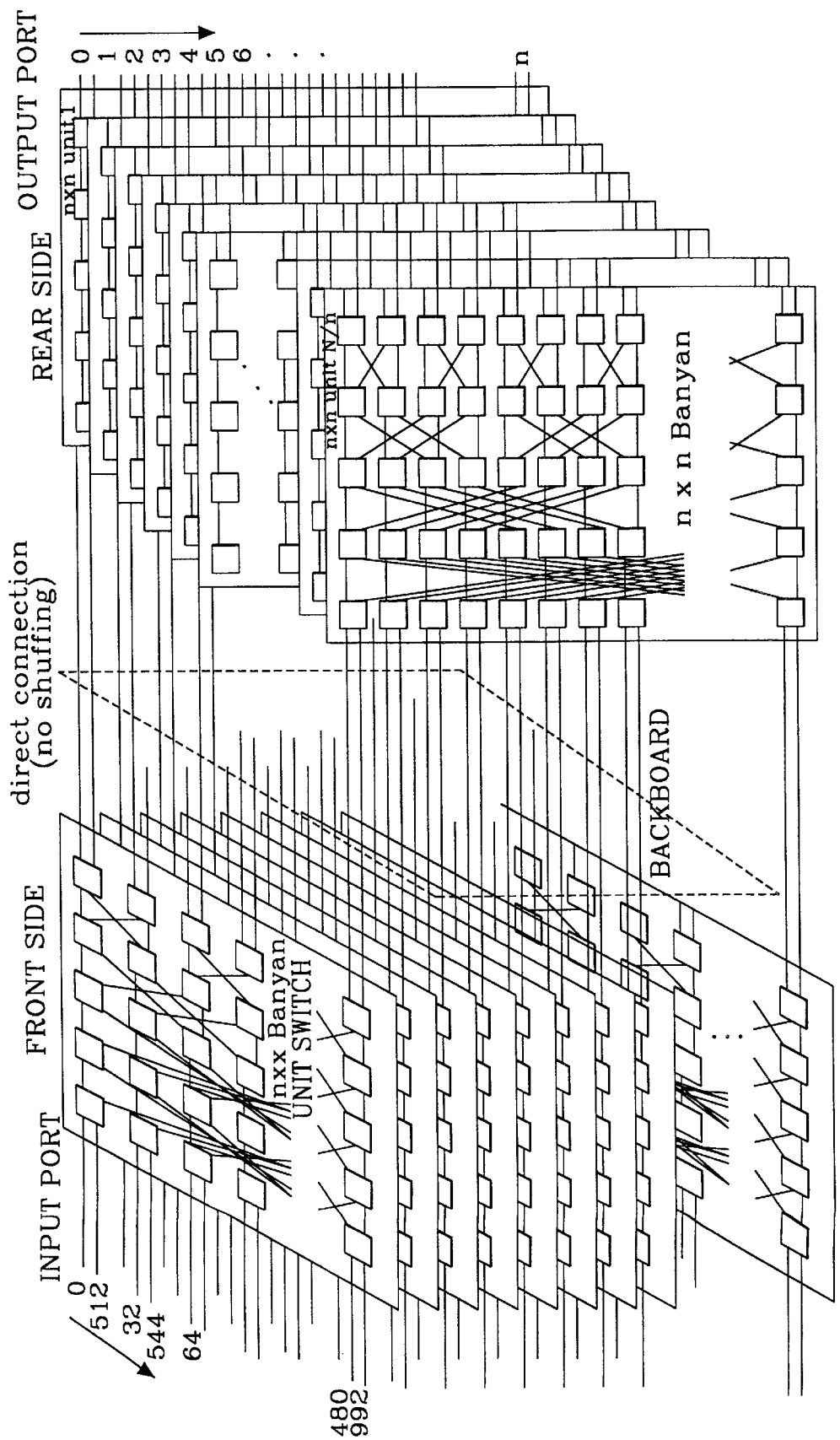
FIG. 8 is a schematic diagram illustrating the construction of the 1,024×1,024 scale of Banyan network constructed by the 3-dimensional switch installation in accordance with the output port number table of FIG. 6 and the input port number table of FIG. 7, the contruction being according to the principles of the present invention.

Now, in order to ascertain the result of the above calculation according to the table, a preferred embodiment will be explained in which a 1,024×1,024 scale of Banyan based switching network is constructed in the 3-dimensional arrangement system, by using a 32×32 scale of unit switches. FIG. 8 illustrates the construction of the 1,024× 1,024 scale of Banyan network constituted by the 3-dimensional switch installation on basis of the output port number table of FIG. 6 and the input port number table of FIG. 7 according to the principles of the present invention. In FIG. 8, the input port numbers of the unit switches, which embodies the 32×32 scale of Banyan network in a single PCB, positioned in the front side of the backboard are calculated as in FIG. 6 on basis of the above table. FIG. 6 illustrates the construction of an output port number table with 1,024×1,024 scale of Banyan network constituted— according to the 3-dimensional switch installation, in which table the output port numbers are reallocated according to the principles of the present invention. Further, the output port numbers of the unit switches positioned in the rear side of the backboard start from the rightmost unit switch taken from the rear side, and the output port numbers in each unit switch are given in sequence downwardly from, the upper side to the lower side.

Figure 7:
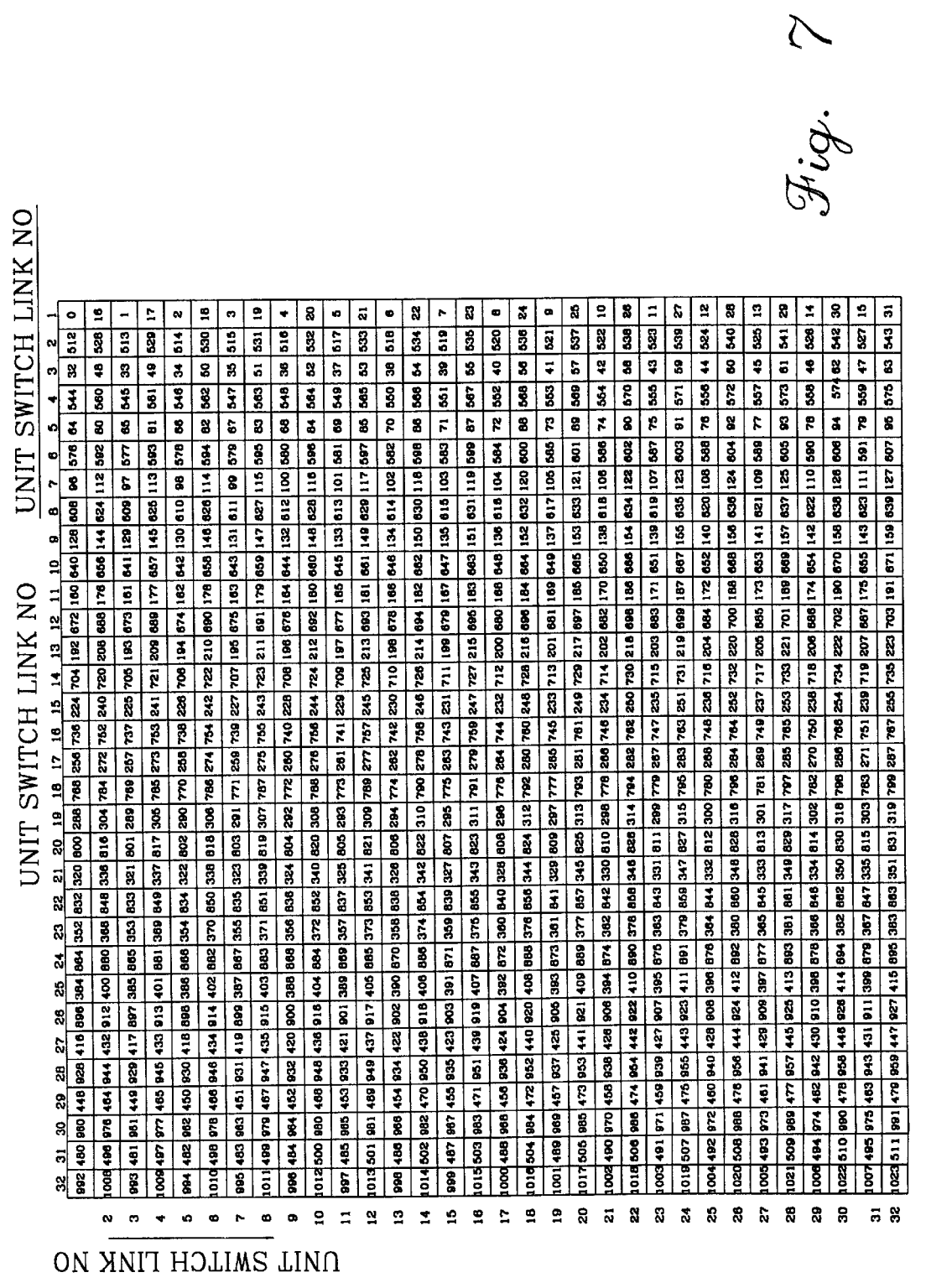

FIG. 7 illustrates the construction of an input port number table with 1,024×1,024 scale of Banyan network constituted according to the 3-dimensional switch installation, in which the input port numbers are allocated according to the principles of the present invention. Therefore, when the 1,024× 1,024 scale of switching network is constructed in the 3-dimensional arrangement system as shown in FIG. 8, the input port allocation of the unit switches in the front side is takes the reshuffling as seen in FIG. 7. In this occasion, the construction of the 1,024×1,024 scale of 3-dimensional switching network is carried out as shown in FIG. 8.

As stated hereinbefore, the present invention re-assigns the input port numbers in order to embody the 3-dimensional ATM switching network—for instance, in the 3-dimensional large (N×N) scale of Banyan network developed by using a small modularized (n×n scale) unit switch. The characteristic of the original Banyan network can be maintained, as it was, by taking the reshuffling of its input port numbers, enjoying the advantages of the 3-dimensional Banyan network.

Although the present invention has been described with reference to the preferred embodiments thereof, those skilled in the art will readily appreciate that various substitutions and modifications can be made thereto without departing from the spirit and scope of the invention as set forth in the appended claims.

What is claimed is:

1. A method for formation of a 3-dimensional asynchronous transfer mode switching network having N input ports and N output ports, comprising the steps of:

positioning a first plurality of unit switches of an n×n scale in a front portion of the switching network, wherein each unit switch of said first plurality of unit switches has n input ports and n out ports;

partitioning said first plurality of unit switches in front unit switches;

positioning a second plurality of unit switches in a rear portion of the switching network, wherein each unit switch of said second plurality of unit switches has n input ports and n output ports;

partitioning said second plurality of unit switches in rear unit switches;

coupling said n output ports of the front unit switches, in sequence and in a crossed manner, to said n input ports of the rear unit switches;

assigning output port numbers of said rear unit switches in sequence from an uppermost position to a lowermost position; and reassigning input port numbers of said front unit switches in accordance with following formula:

(i,j)=Xn+Y, wherein Xn={jquo2+n/{2{jmod2}}}, and Y={iquo2+n/{2{imod2}}}, and i corresponds to a number of row, and j corresponds to a number of column, and wherein "iquo2" denotes the quotient of "i" divided by 2, and "imod2" denotes the remainder of "i" divided by 2, and "jquo2" denotes the quotient of "j" divided by 2, and "jmod2" denotes the remainder of "j" divided by 2.

2. The method of claim 1 wherein N is greater than n.

3. The method of claim 1, wherein N is equal to n multiplied by N.

4. A switching network having N input ports and N output ports, comprising:

a first plurality of unit switches positioned in a front portion of the switching network, said first plurality of unit switches used in partitioning as front unit switches, wherein each unit switch of said first plurality of unit switches has n input ports and n output ports;

a second plurality of unit switches positioned in a rear portion of the switching network, said second plurality of unit switches used in partitioning as rear unit switches, wherein each unit switch of said second plurality of unit switches has n input ports and n output ports;

said n output ports of said front unit switches coupled, in sequence and in a crossed manner, to said n input ports of said rear unit switches, wherein each of said n input ports of said front unit switches are assigned an input port number and each of said n output ports of said rear unit switches are assigned an output port number;

wherein the input port numbers of said front unit switches are reassigned in accordance with the following formula, and the output port numbers of said rear unit switches are assigned in sequence from the uppermost position to the lowermost position;

(i,j)=Xn+Y, wherein Xn={jquo2+n/{2{imod2}}}, and Y={iquo2+n/{2{imod2}}}, and i corresponds to a number of row, and j corresponds to a number of column, and "iquo2" denotes the quotient of "i" divided by 2, and "imod2" denotes the remainder of "i" divided by 2, and "jquo2" denotes the quotient of "j" divided by 2, and "jmod2" denotes the remainder of "j" divided by 2.

5. The network of claim 4, with the network being in an asynchronous transfer mode on basis of a Banyan network.

6. The network of claim 4, wherein N is greater than n.

7. The network of claim 4, wherein N is equal to n multiplied by n.

8. The network of claim 4, wherein the network is of three dimensional structure.

9. The network of claim 4, wherein said first plurality of unit switches is a module within said switching network.

10. The network of claim 4, wherein said first plurality of unit switches is a module within said switching network.

11. The network of claim 4, wherein N corresponds to 1024.

12. The network of claim 4, wherein n corresponds to 32.

13. A method of forming a switching network having N input ports and N output ports, comprising the steps of:

positioning a first plurality of unit switches at a front portion of the switching network;

partitioning by using said first plurality of unit switches as front unit switches;

positioning a second plurality of unit switches at a rear portion of the switching network;

partitioning by using said second plurality of unit switches as rear unit switches;

placing a plurality of n input ports and n output ports in each one of the front unit switches;

placing a plurality of n input ports and n output ports in each one of the rear unit switches;

coupling said n output ports of said front unit switches, in sequence and in a crossed manner, to said n input ports of said rear unit switches, wherein each of said n output ports of said front unit switches are assigned an output port number and each of said n input ports of said rear unit switches are assigned an input port number; and wherein the input port numbers of said front unit switches are reassigned in accordance with the following formula, and the output port numbers of said rear unit switches are assigned in sequence from the uppermost position to the lowermost position:

(i,j)=Xn+Y, wherein Xn={jquo2+n/{2{imod2}}}, and Y={iquo2+n/{2{imod2}}}, and i corresponds to a number of row, and j corresponds to a number of column, and "iquo2" denotes the quotient of "i" divided by 2, and "imod2" denotes the remainder of "i" divided by 2, and "jquo2" denotes the quotient of "j" divided by 2, and "jmod2" denotes the remainder of "j" divided by 2.

14. The network of claim 13, with the network being in an asynchronous transfer mode on basis of a Banyan network.

15. The network of claim 13, wherein N is greater than n.

16. The network of claim 13, wherein N is equal to n multiplied by n.

17. The network of claim 13, wherein the network is of three dimensional structure.

18. The network of claim 13, wherein the switching network is formed on one printed circuit board.

19. The network of claim 14, wherein the switching network is formed on one printed circuit board.

* * * * *